United States Patent [19]
Siu

[11] Patent Number: 6,006,658
[45] Date of Patent: Dec. 28, 1999

[54] ELECTRICAL DEEP FRYER

[76] Inventor: Chong Fu Siu, 2404 Fu Tai House, Tai Wo Hau, Kwai Chung, The Hong Kong Special Administrative Region of the People's Republic of China

[21] Appl. No.: 09/303,169

[22] Filed: Apr. 30, 1999

[51] Int. Cl.$^6$ ..................................................... A47F 37/12
[52] U.S. Cl. ................................ 99/336; 99/348; 99/407; 99/409; 99/410
[58] Field of Search ..................... 99/330–336, 403–407, 99/408–417, 427, 348; 210/167, DIG. 8; 126/391, 219; 219/521, 492, 494

[56] References Cited

U.S. PATENT DOCUMENTS

| | | | |
|---|---|---|---|
| 2,915,000 | 12/1959 | Hetzel et al. | 99/336 X |
| 3,078,786 | 2/1963 | Arvan | 99/336 |
| 3,501,316 | 3/1970 | Guthrie, Sr. | 210/DIG. 8 |
| 3,690,246 | 9/1972 | Guthrie, Sr. | 210/DIG. 8 |
| 4,539,898 | 9/1985 | Bishop et al. | 99/407 X |
| 4,852,471 | 8/1989 | Lansing | 99/336 X |
| 4,901,633 | 2/1990 | De Longhi | 99/409 |
| 4,951,558 | 8/1990 | Figliuzzi | 99/410 X |
| 5,027,697 | 7/1991 | De Longhi | 99/409 |
| 5,379,684 | 1/1995 | Ettridge | 99/413 X |
| 5,469,778 | 11/1995 | Prudhomme | 99/336 |

*Primary Examiner*—Timothy Simone
*Attorney, Agent, or Firm*—Jackson Walker L.L.P.

[57] ABSTRACT

An electrical deep fryer has a pan, a housing, an electrical heating element, a compartment and a removable hinged lid. These components, except the heating element which is permanently fixed to the pan, are easily assembled, and dissembled for washing. The compartment incorporated all the electrical components for controlling and supplying power to the fryer that cannot be wetted without damage. Thus, the remaining parts of the fryer can be thoroughly washed when required, using a dish-washer if preferred.

8 Claims, 2 Drawing Sheets

ELECTRICAL DEEP FRYER

BACKGROUND OF THE INVENTION

1. Field of the Invention

The invention relates to an electrical deep fryer.

2. Description of Prior Art

Electrical deep fryers are generally known and used for frying many kinds of food in oil or fat. From time to time during use, it is necessary to clean the fryer and it is preferable to thoroughly clean the fryer before storage for example. Not only does the pan itself require cleaning but also the container or housing need washing. This is not an easy matter as the fryer normally incorporates controls and other electrical equipment that would suffer damage if wetted.

SUMMARY OF THE INVENTION

It is an object of the invention to overcome or at least reduce this problem.

According to the invention there is provided an electrical deep fryer having a pan, an electrical resistance heating element arranged to heat the pan, a housing surrounding the pan, an electrical controller incorporating a number of electrical components for receiving power from an external power supply and for controlling the supply of power to the heating element and automatic operation of the fryer, in which the electrical controller is contained in removable compartment that removably fits against or forms part of an outside of the housing and plugs to the electrical heating element, such that the compartment can be removed for washing the fryer.

A removable hinged lid for the housing may be provided.

The electrical deep fryer may include a movable food basket supporting mechanism mounted to a side of the pan arranged to lift a basket up and down inside the pan, including a drive spindle extending out the pan, and a drive connection mounted in the compartment that slips off the drive spindle when the compartment is taken away from the housing.

The drive connection may comprise a manually rotatable knob, or an electric motor may be mounted in the compartment coupled to the drive connection.

A locating pin may be mounted to a base of the pan for holding the pan in position in the housing, and an aperture in the housing provided through which the locating pin fits. The locating pin may be threaded and fitted with a manually rotatable nut that holds the pan in the housing.

The electrical deep fryer may include electrical female power safety sockets mounted to the compartment to which corresponding male sockets on the electrical heating coil automatically connect as the compartment is fitted to the housing.

BRIEF DESCRIPTION OF THE DRAWING

A deep fryer according to the invention will now be described by way of example with reference to the accompanying drawings in which.

DESCRIPTION OF THE PREFERRED EMBODIMENTS

Figure 1:
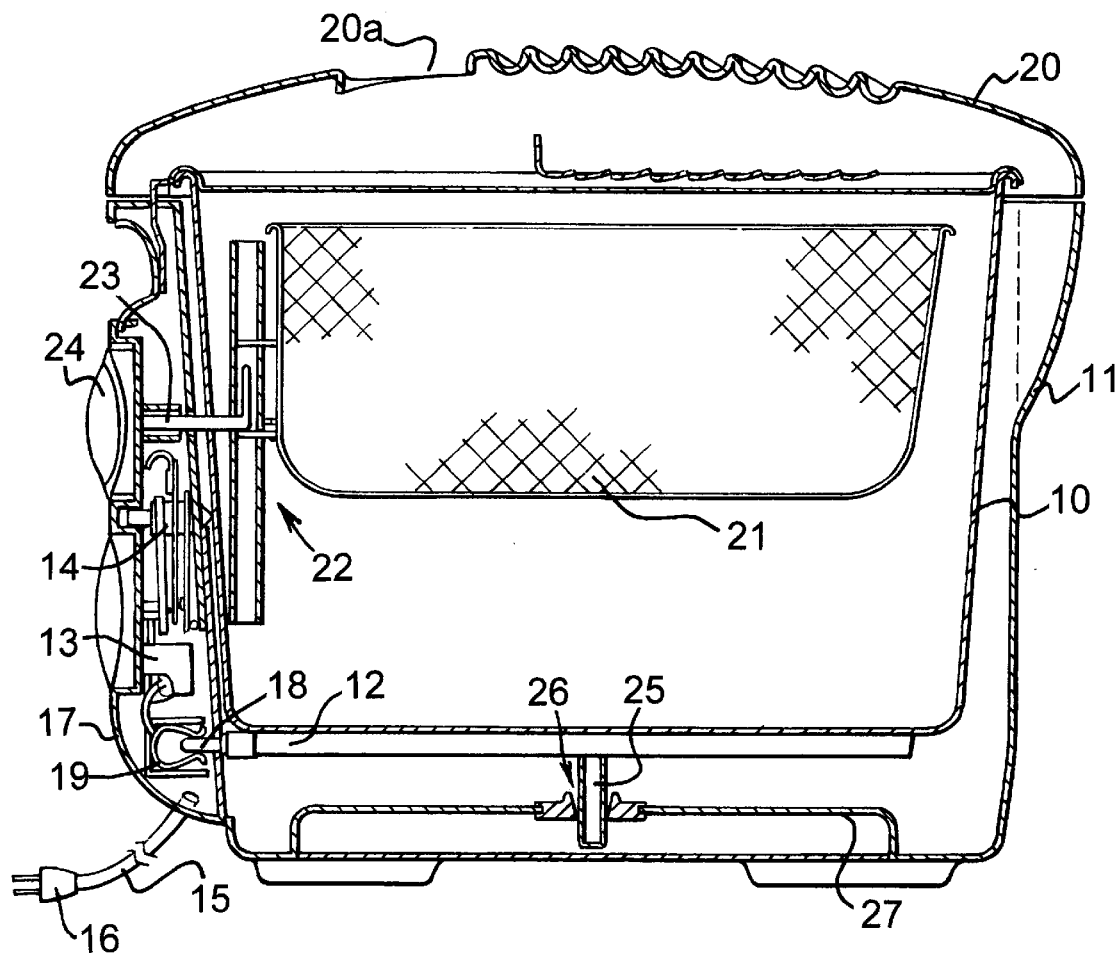
FIG. 1 is a sectional elevation of the fryer.

Referring to the drawings, in FIG. 1 the fryer comprises a pan 10, a housing 11 surrounding the pan, and an electrical resistance heating element 12. An electrical controller 13 incorporates various electrical components (not shown), including a manually operable thermostat 14. The controller is arranged and adjustable, in a manner well-known, to receive power via an electrical supply cable 15 and a plug 16 from a normal domestic supply and, inter alia, supply the heating element 12 with electrical power. The controller 13 is mounted to and supported by a compartment 17 that forms part of the outside of the housing 11 when fitted to the housing 11 as shown in FIG. 1.

The heating element 12 has male connectors 18 fixed thereto that engage in safety electrical female sockets 19 mounted in the compartment 17. As and when the compartment is fitted to the housing 11, the connectors 18 mate automatically with the sockets 19 as required.

The housing 11 has an apertured removable hinged lid 20 with a viewing window 21. The lid may include air filter elements (not shown) mounted under apertures in the lid. A food basket 21 is supported inside the pan 10 by a lifting and lowering mechanism 22. The basket is moved up and down by rotating a drive spindle 23. In the described embodiment, the spindle is turned using a knob 24 mounted to the compartment 17 so that the basket 21 can be manually moved up and down as required. In other embodiments, the compartment 17 can include an electric motor and the basket be moved up and down by the motor when required. When the compartment 17 is removed, the knob 24 (or a motor drive connection as appropriate) slides off the drive spindle 23.

The pan 10 has a locating pin 25 on its base that fits through an aperture 26 in a raised platform 27 in a base of the housing 11. The pin 25 normally has a threaded end so that a securing manually rotatable nut can be used to hold the pin 26 down and the pan 10 firmly in position in the housing 11.

Figure 2:
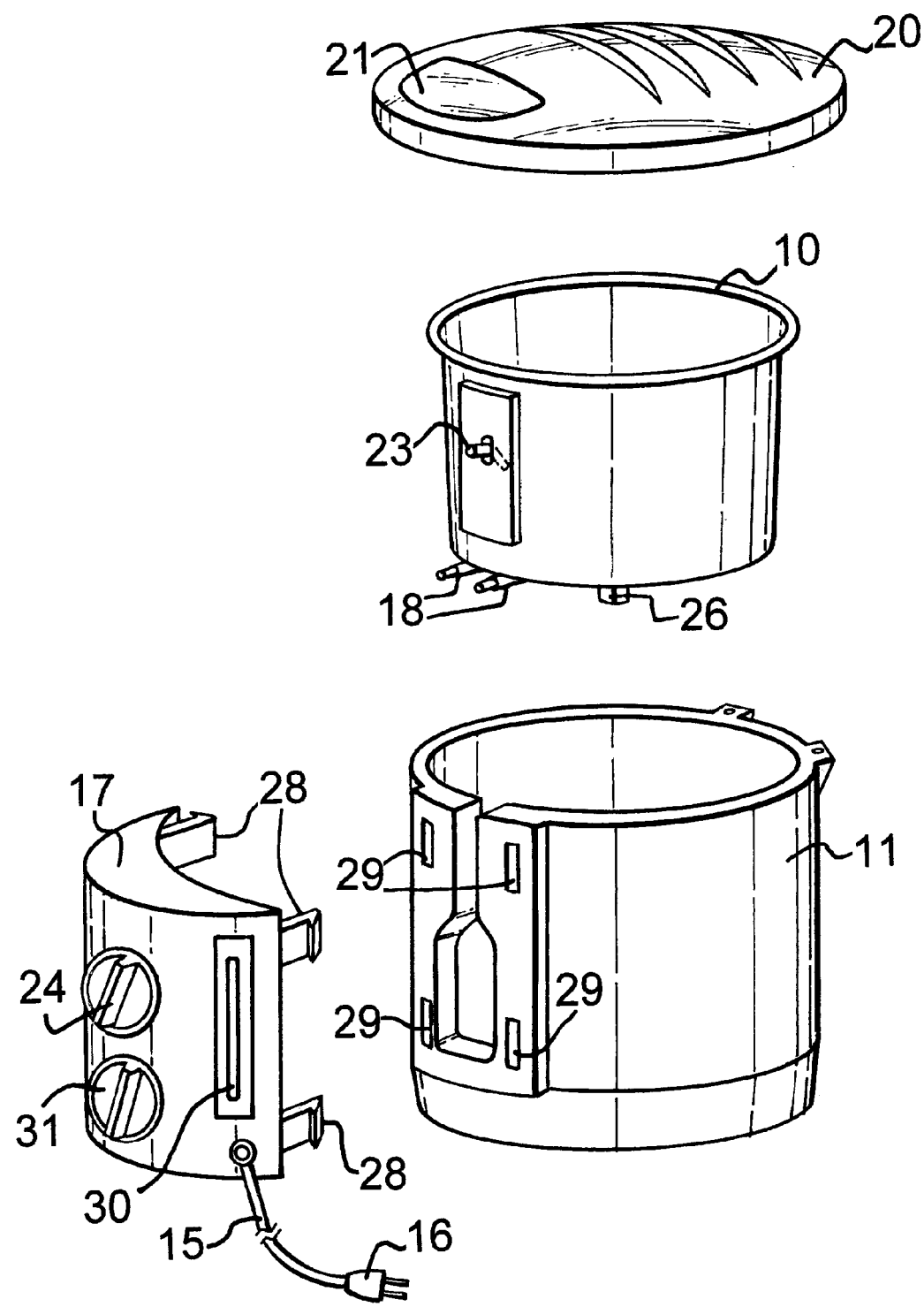
FIG. 2 is an exploded isometric view of the fryer.

In FIG. 2, the same numerals are used for the same parts. The housing 17 has four resilient clips 28 that engage respective slots 29 in a side of the housing 11. The clips 28 can be eased against their natural bias by opposing push bars 30 (only one is visible in FIG. 2) mounted in the housing 17. Thus, if the bars 30 are manually pushed towards one other, the clips 28 will move inwards sufficiently to allow the compartment 17 to be pulled away from the housing 11. A control knob 31 is provided for adjusting the thermostat 14.

It will be noted that compartment forms in effect part of the outside of the housing during normal use of the fryer. The pan is easily removed, once the compartment 17 has been taken off the housing 11 by, releasing a nut on the locating bolt 25 if present and, lifting the pan 10 upwards out of the housing 11.

The important aspect of embodiments of the invention is that all the electrical components (including the cable 15 and the plug 16), or parts of the fryer that cannot be safety thoroughly wetted are housed or mounted to the compartment 17. Thus, once the compartment is taken off the remaining parts of the fryer can be thoroughly washed or placed in a dish-washer where preferred for cleaning.

It will be appreciated that for this to be practical, the heating element 12 is formed as a water-sealed unit and/or sealed or welded to the base of the pan 10 as required. As such the pan 10 with the heating element attached can be safely submersed in water for cleaning if desired.

I claim:

1. An electrical deep fryer having a pan, an electrical resistance heating element arranged to heat the pan, a housing surrounding the pan, an electrical controller incorporating a number of electrical components for receiving power from an external power supply and for controlling the supply of power to the heating element and automatic operation of the fryer, in which the electrical controller is contained in removable compartment that removably fits against or forms part of an outside of the housing and plugs to the electrical heating element, such that the compartment can be removed for washing the fryer.

2. An electrical deep fryer according to claim 1, including a removable hinged lid for the housing.

3. An electrical deep fryer according to claim 1, including a movable food basket supporting mechanism mounted to a side of the pan arranged to lift a basket up and down inside the pan, including a drive spindle extending out the pan, and a drive connection mounted in the compartment that slips off the drive spindle when the compartment is taken away from the housing.

4. An electrical deep fryer according to claim 3, in which the drive connection comprises a manually rotatable knob.

5. An electrical deep fryer according to claim 3, including an electric motor in the compartment coupled to the drive connection.

6. An electrical deep fryer according to claim 1, including a locating pin mounted to a base of the pan for holding the pan in position in the housing, and an aperture in the housing through which the locating pin fits.

7. An electrical deep fryer according to claim 6, in which the locating pin is threaded and fitted with a manually rotatable nut that holds the pan in the housing.

8. An electrical deep fryer according to claim 1, including electrical female power safety sockets mounted to the compartment to which corresponding male sockets on the electrical heating coil automatically connect as the compartment is fitted to the housing.

* * * * *